United States Patent [19]

Hager et al.

[11] Patent Number: 4,689,708
[45] Date of Patent: Aug. 25, 1987

[54] ZONE PROTECTIVE DIRECTIONAL RELAY SCHEME

[75] Inventors: Helmut Hager, Lengnau; Jürgen Kopainsky, Brugg; Kurt Zwahlen, Oberrohrdorf, all of Switzerland

[73] Assignee: BBC Brown, Boveri & Co., Ltd., Switzerland

[21] Appl. No.: 787,777

[22] Filed: Oct. 15, 1985

[30] Foreign Application Priority Data

Aug. 2, 1985 [CH] Switzerland .................. 3340/85

[51] Int. Cl.$^4$ ............................................. H02H 7/28
[52] U.S. Cl. ...................................... 361/65; 361/68; 361/81; 361/82; 361/84
[58] Field of Search .................. 361/62, 63, 64, 65, 361/66, 80, 81, 82, 84, 67, 68, 83

[56] References Cited

U.S. PATENT DOCUMENTS 4,538,195  8/1985  Elmore ................................. 361/64
4,538,196  8/1985  Sun ..................................... 361/64

Primary Examiner—A. D. Pellinen
Assistant Examiner—H. L. Williams
Attorney, Agent, or Firm—Ostrolenk, Faber, Gerb & Soffen

[57] ABSTRACT

A protective system for protecting elements (for example D) of an electric power system allocates a protection zone to each element. The protection zones are defined by switching points (for example 19', ..., 24') which isolate the associated element (for example D) from the power system. Each of these switching points is associated with a transmitter/actuator unit (for example 19, ..., 24). The transmitter/actuator units (for example 19, ..., 24) produce "open" commands for their associated switching points (for example 19', ..., 24') if it is determined that a fault has occurred inside the associated protection zone. The "open" commands for the switching points (for example 19', ..., 24') are formed locally within the vicinity of each of the switching points. This is realized by the transmitter/actuator units (for example 22) which contain two evaluating units (for example 22D, 22L8) which are respectively allocated to different protection zones, and in that all evaluating units allocated to one protection zone (for example 19D, ..., 24D) communicate with each other via local data links (N) and remote data links (F).

8 Claims, 4 Drawing Figures

ZONE PROTECTIVE DIRECTIONAL RELAY SCHEME

BACKGROUND AND SUMMARY OF THE INVENTION

The invention is directed to a protective device for an electric power system.

The invention relates to a system as described, for example, in Auslegeschrift No. 112,562 of the German Democratic Republic. In the known protective device for electric power systems, the individual objects to be protected can be isolated, in the event of a fault, via switching points constructed of circuit breakers. The faults occurring are in this case detected by fault-direction-oriented protection instruments. If a fault occurs within a protective zone which is allocated to the object to be protected and which is essentially determined by the switching points isolating the object to be protected from the power system, a centralised evaluating unit allocated to this protection zone provides switching-off commands to the switching points.

The invention as characterised in the claims achieves the objective of creating a protective device of the generic type, in which device the switching-off commands to the switching points of a protection zone are in each case formed locally in the vicinity of each of these switching points.

The protective device according to the invention is particularly characterised in that each switching point is associated with a transmitter/actuator unit, which transmitter/actuator units communicate with each other at the same hierarchical level. This provides decentralised operation of the protective device according to the invention, resulting in high availability and redundancy.

The invention is explained below in greater detail with reference to the drawing, in which:

DETAILED DESCRIPTION OF THE PREFERRED EMBODIMENTS

Figure 1:
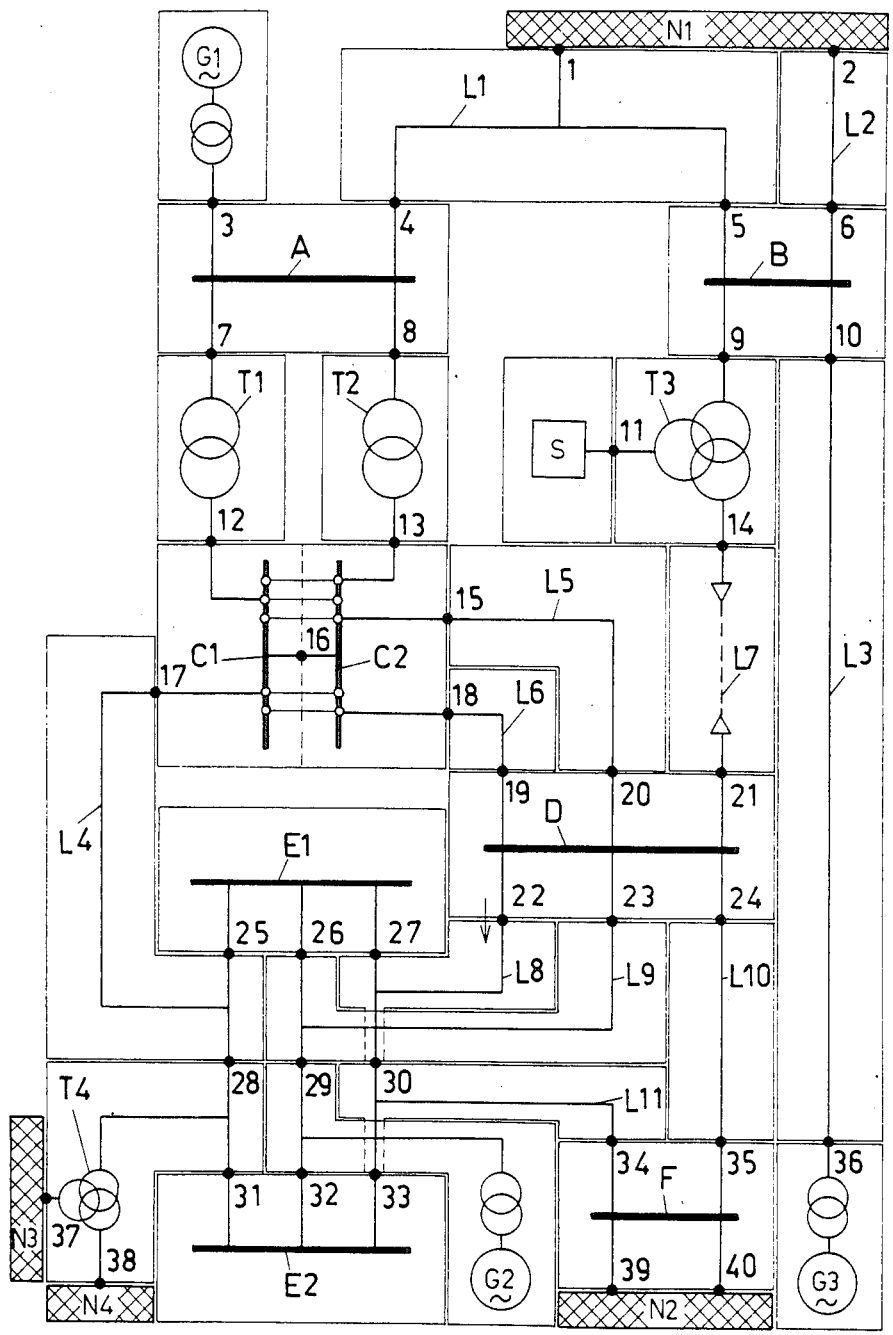
FIG. 1 shows a section of a basic circuit diagram of an energy-distribution system.

The energy distribution network of FIG. 1 shows two voltage levels.

The first voltage level contains objects to be protected, such as busbars A and B, lines $L_1$, $L_2$, $L_3$ and generators $G_1$ and $G_3$ and the associated generator-transformers. This voltage level is connected to an adjacent power system $N_1$.

The second voltage level consists of busbars $C_1$, $C_2$, D, $E_1$, $E_2$ and F, lines and cables $L_4$, $L_5$, $L_6$, $L_7$, $L_8$, $L_9$, $L_{10}$ and $L_{11}$ and a generator $G_2$ and its associated generator-transformer (without generator switch). This voltage level is connected to an adjacent power system $N_2$.

The voltage levels are linked by transformers $T_1$, $T_2$ and $T_3$. In this arrangement, transformer $T_3$ is a three-winding transformer. The tertiary winding of $T_3$ is connected to a reactive-power compensator S (rotating or static). Another three-winding transformer $T_4$ is connected to two further power systems $N_3$ and $N_4$.

The lines $L_5$ and $L_6$ and $L_8$ and $L_9$ in each case form a double-circuit line and two systems having the same rated voltage on the same tower. Lines $L_3$ and $L_{10}$ are carried in parallel over the entire length of $L_{10}$ on the same tower and form a double-circuit line having different rated voltages.

The busbars $C_1$ and $C_2$ are constructed as dual busbars in which each branch, as for example transformers $T_1$ and $T_2$ and the lines $L_4$, $L_5$ and $L_6$, can be optionally connected to each of the two busbars via isolating switches (shown as circles in the Figure). $C_1$ and $C_2$ are linked by a switching point 16' constructed as a tie switch. The busbars $E_1$ and $E_2$ form a $1\frac{1}{2}$ switch system in which one group each of two branches, such as $L_4$ and $T_4$ or $L_9$ and $G_2$ or $L_8$ and $L_{11}$ are connected via, in each case, three switching points 25', 28', 31' or 26', 29', 32' or 27', 30', 33', constructed as circuit breakers, between busbars $E_1$ and $E_2$.

This energy distribution system is divided into protection zones. Each of these protection zones is allocated to an object to be protected, for example to generator $G_1$ or to busbar A. The boundaries of each protection zone are marked in FIG. 1 by thin and straight lines. The boundaries of the protection zones can be freely selected in accordance with the requirements of selectivity by a suitable arrangement of switching points 1', 2', ..., 39', 40' (FIG. 2) on links between the individual objects of the energy distribution system or at its links to other system parts such as, for example, $N_1$ or $N_2$. The boundaries of the protection zones can be fixed or can be determined by the mimic diagram (isolator diagram) in accordance with current topology as, for example, in the case of protection of the busbars $C_1$ and $C_2$. Thus, for example, the isolator settings determine the boundaries of the protection zone, for example, in the case of busbars $C_1$ and $C_2$. In this arrangement, it is also possible that busbars are additionally further subdivided by sectionalising switches or ties.

The protection zones can also be hierarchically nested so that inter-system faults can also be selectively detected. For example, the double-circuit lines $L_5/L_6$ or $L_8/L_9$ or $L_3/L_{10}$ can be associated with higher-level protection zones which in each case comprise two protection zones of $L_5$ and $L_6$ or of $L_8$ and $L_9$ or $L_3$ and $L_{10}$ and provide the possibility of phase-selective disconnectionn of faults between two lines located on the same tower.

A switching point is provided exactly at the transitions from one protection zone to another, for example the switching point 4' at the common boundary of the protection zones of line $L_1$ and busbar A. The protection zone of line $L_1$ is thus placed adjacent to the protection zone of busbar A. Each protection zone is limited by the switching points located in the links between the object located in the protection zone and the adjacent protection zones. For example, the protection zone allocated to busbar D is limited by switching points 19', 20', 21', 22', 23' and 24'.

Each switching point 1', 2', ..., 40' is associated with a transmitter/actuator unit, not shown in FIG. 1, which primarily has the objective of determining fault-direction signals from current and voltage measurements at the switching point and, if necessary, providing a trip command to the associated switching point. The transmitter actuator units of switching points 1', ..., 40' are essentially constructed in the same manner.

Figure 2:
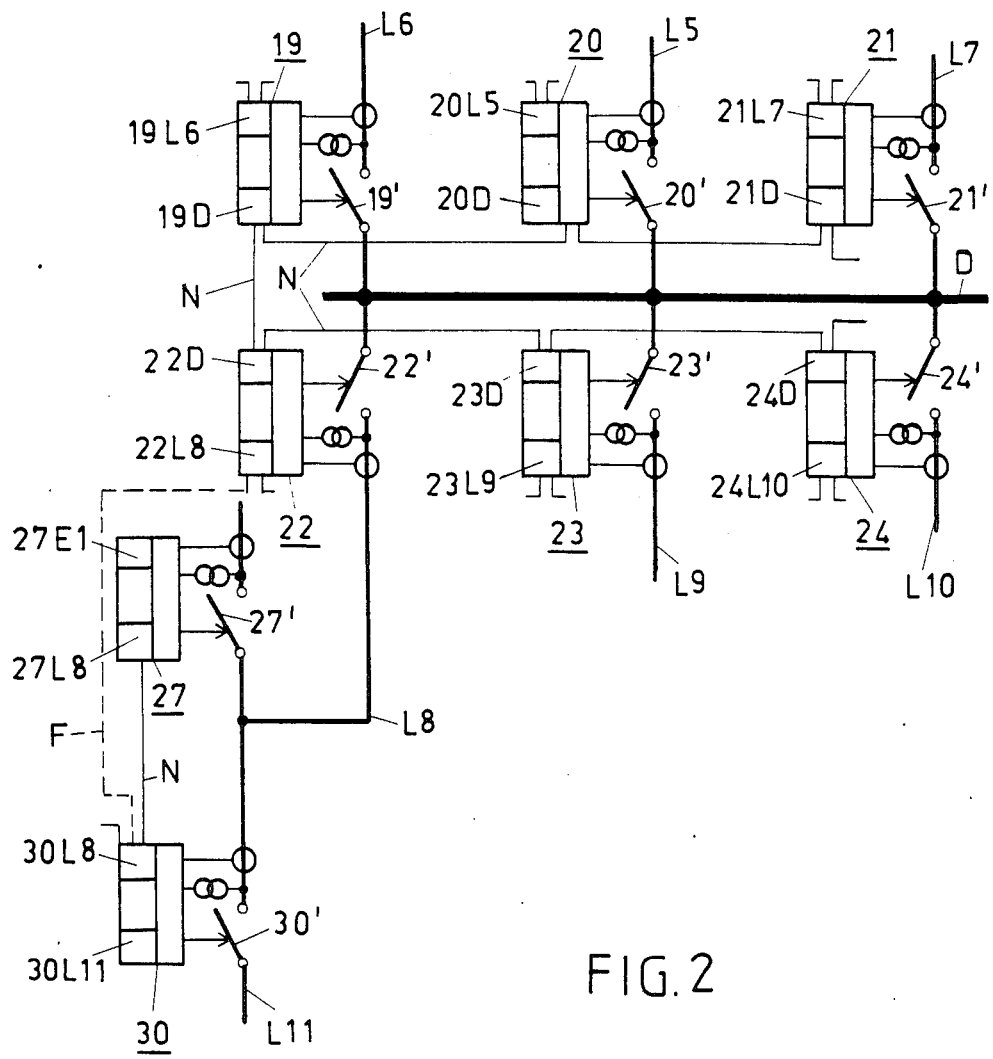
FIG. 2 shows a section of the basic circuit diagram according to FIG. 1 in which a protective device, in accordance with the invention which comprises transmitter/actuator units, is added.

In FIG. 2, the transmitter/actuator units 19, 20, 21, 22, 23, 24, 27 and 30, which are allocated to the switching points 19', 20', 21', 22', 23', 24', 27' and 30' determining the protection zones of the busbar D and of the line $L_8$, respectively, are shown as representatives for these transmitter/actuator units. Switching point 22' forms the boundary between the protection zones mentioned.

Each of the transmitter/actuator units 19, 20, 21, 22, 23, 24, 27 and 30 shown in FIG. 2 contains measurement-value transmitters (represented by non-referenced transducer symbols) for current and voltage signals directly in front of switching point 19', 20', 21', 22', 23', 24', 27' and 30' and an actuator (represented by an arrow) which acts on the associated switching point. In addition, each of the transmitter/actuator units 19; 20; 21; 22; 23; 24; 27 and 30 successively contains in each case exactly two evaluating units 19L6, 19D; 20L5, 20D; 21L7, 21D; 22D, 22L8; 23D, 23L9; 24D, 24L10; 27E1, 27L8 and 30L8, 30L11. These evaluating units are connected via local data links N, in continuous lines, and/or via remote data links F, in dashed lines, to all transmitter/actuator units allocated to the switching points of a protection zone. Thus, for example, the evaluating units 21D, 20D, 19D, 22D, 23D, 24D of the transmitter/actuator units 21, 20, 19, 22, 23, 24 of the switching points 21', 20', 19', 22', 23', 24' allocated to busbar D are linked to each other via local data links N whereas the evaluating units 22L8 and 30L8 of the transmitter actuator units 22 and 30 of the switching points 22' and 30' allocated to line L8 are linked with each other via a remote data link F and only the evaluating units 27L8 and 30L8 of the transmitter/actuator units 27 and 30 of the switching points 27' and 30' allocated to line $L_8$ are linked with each other via a local data link N.

Figure 3:
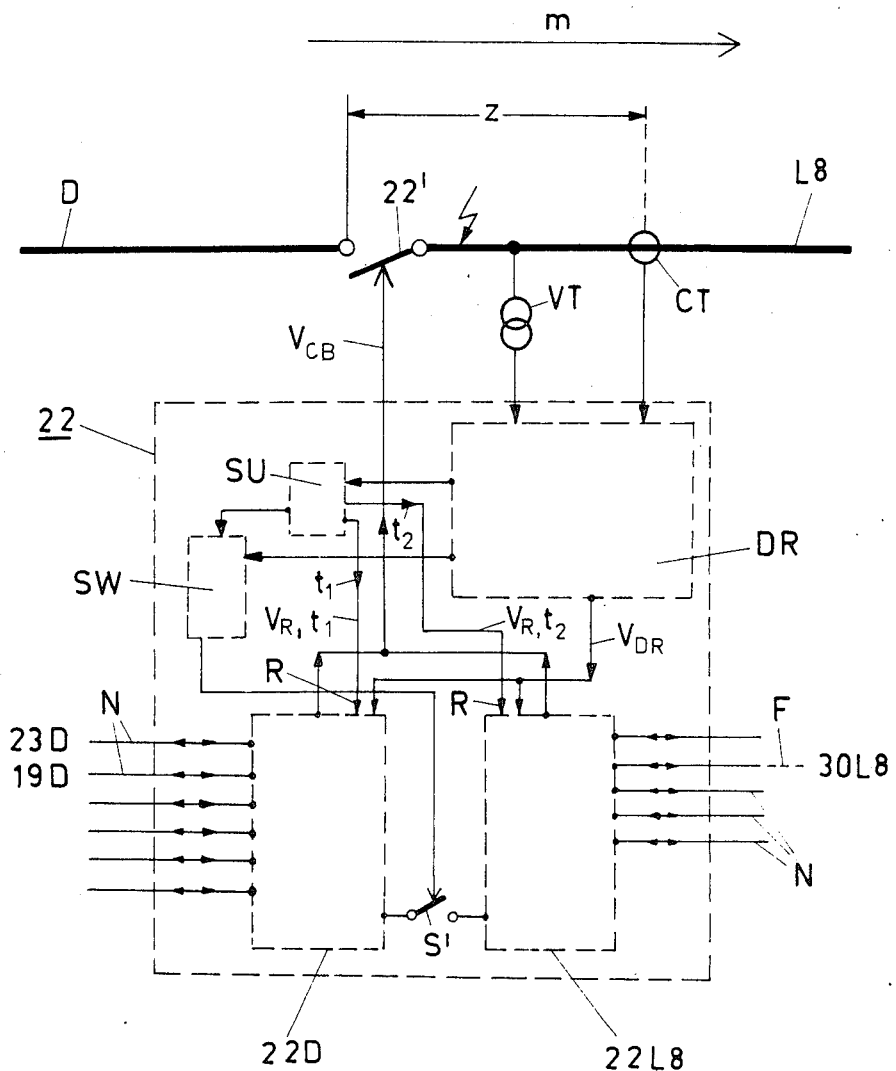
FIG. 3 illustrates a transmitter/actuator unit of the type specified in FIG. 2.

In FIG. 3, the transmitter/actuator unit 22 is explained in greater detail unit 22 is representative of all transmitter/actuator units constructed in the same manner. Unit 22 contains a protective device DR (in dashed lines) having inputs which are connected phase by phase to the signal outputs of a current and a voltage transformer CT and VT, the two evaluating units 22D and 22L8, a current sensing unit SU, a data link (symbolically designated as switch S') which can be activated and is placed between the two evaluating units 22D and 22L8, and data links $V_{DR}$ and $V_{CB}$.

In this arrangement, the measuring points of current and voltage tranformers CT and VT are connected in series with switching point 22' into the link between busbar D and line $L_8$. These measuring points can also be interchanged with respect to the position drawn in FIG. 3.

The boundary of the protection zone is established by the position of the current transformer CT. The path Z between the switching point 22' and the measuring point of the current transformer CT is called the "dead zone+.

The protective device DR is a fault-direction detector. The fault-direction detector DR has the objective of detecting a fault, indicating the phase concerned and the direction of this fault with respect to the observation point, that is to say with respect to the measuring location (current and voltage transformer). For this purpose, it is necessary to measure current and voltage locally for each phase before and during the occurrence of the fault. Evaluation is carried out by suitably combining these measured values. In the fault-direction detector used in this case, step signals of current and voltage are formed by forming the difference, from which step signals the direction of the fault location in the phase concerned can be determined with respect to the measuring point with the aid of an arithmetic unit built into the fault-direction detector. The construction and operation of such fault-direction detectors are known, for example, from Swiss Auslegeschrift No. 5,642,491 and from European Patent Auslegeschrift No. 10,084,191. However, other valuation methods are also possible such as, for example, voltage-polarised overcurrent relays, relays with a combination of overcurrent and short-circuit power direction features or distance relays.

To have a specific measurement orientation in the transmitter/actuator units, the sequence in which the switching point, for example 22', voltage transformer VT and current transformer CT are connected in series into the link between two objects, for example D and $L_8$, are defined as the measurement orientation m (see FIG. 3).

The local data link $V_{DR}$ provided in each of the transmitter/actuator units, for example 22, causes data to be moved from the fault-direction detector DR to the two evaluating units, for example 22D and 22L8, the transmitter/actuator unit concerned, for example 22, and the local data link $V_{CB}$ causes data to be moved from the two evaluating units, for example 22D and 22L8, and an actuating member, not shown, of the associated switching point, for example 22'.

Each of the evaluating units, for example, 22D, is effectively connected via $V_{DR}$ to the protective device DR and, via the local data link N and/or remote data link F to the other transmitter/actuator units, for example 19, 20, 21, 23 and 24 of a protection zone, for example of busbar D. The effective connection to the other transmitter/actuator units, for example 19, can be established directly via a data link, for example, N, so that individual messages from the transmitter/actuator unit concerned, for example 19, are received, but it can also be established indirectly, for example via local data link N and/or remote data link F and at least one further transmitter/actuator unit, for example 19, 20 (see FIG. 2). The evaluating unit then receives from the adjacently arranged transmitter/actuator unit, for example 19, group messages which contain information items on the state of transmitter actuator units, for example 20, 21 which are effectively connected to the transmitter EM only via the adjacently arranged transmitter/actuator unit, for example 19. Each of the evaluating units, for example 22D is effectively connected via $V_{CB}$ to the switching point, for example 22', which is allocated to its transmitter/actuator unit, for example 22, and directly or indirectly via the local data link N and/or remote data links F to the other transmitter/actuator units, for example 19, 20, 21, 23 and 24 of a protection zone, for example of the busbar D.

The following binary signals can be transmitted via the local data links $V_{CB}$ and $V_{DR}$:

Switching point status (open/closed, ready for operation not ready for operation (diagnostic)),
Status of protective devices DR (functional/non-functional (self-diagnosis in progress)),
Report as to whether voltage is applied to the measuring point, Direction decision of the protective device DR constructed as fault-direction detector: fault in orientation of measurement, opposite to orientation of measurement, undecided, Opening command to switching point, Execution report of switching point opening (possibly supplemented by back-up switch protection), Messages sent by a current-sensing unit SU whether the current at the measuring point has dropped to zero (if switching point open and current not equal to zero at the measuring point, a unilaterally supplied fault is present in the "dead zone"), Switching-on commands to the switching point (reconnection).

Figure 4:
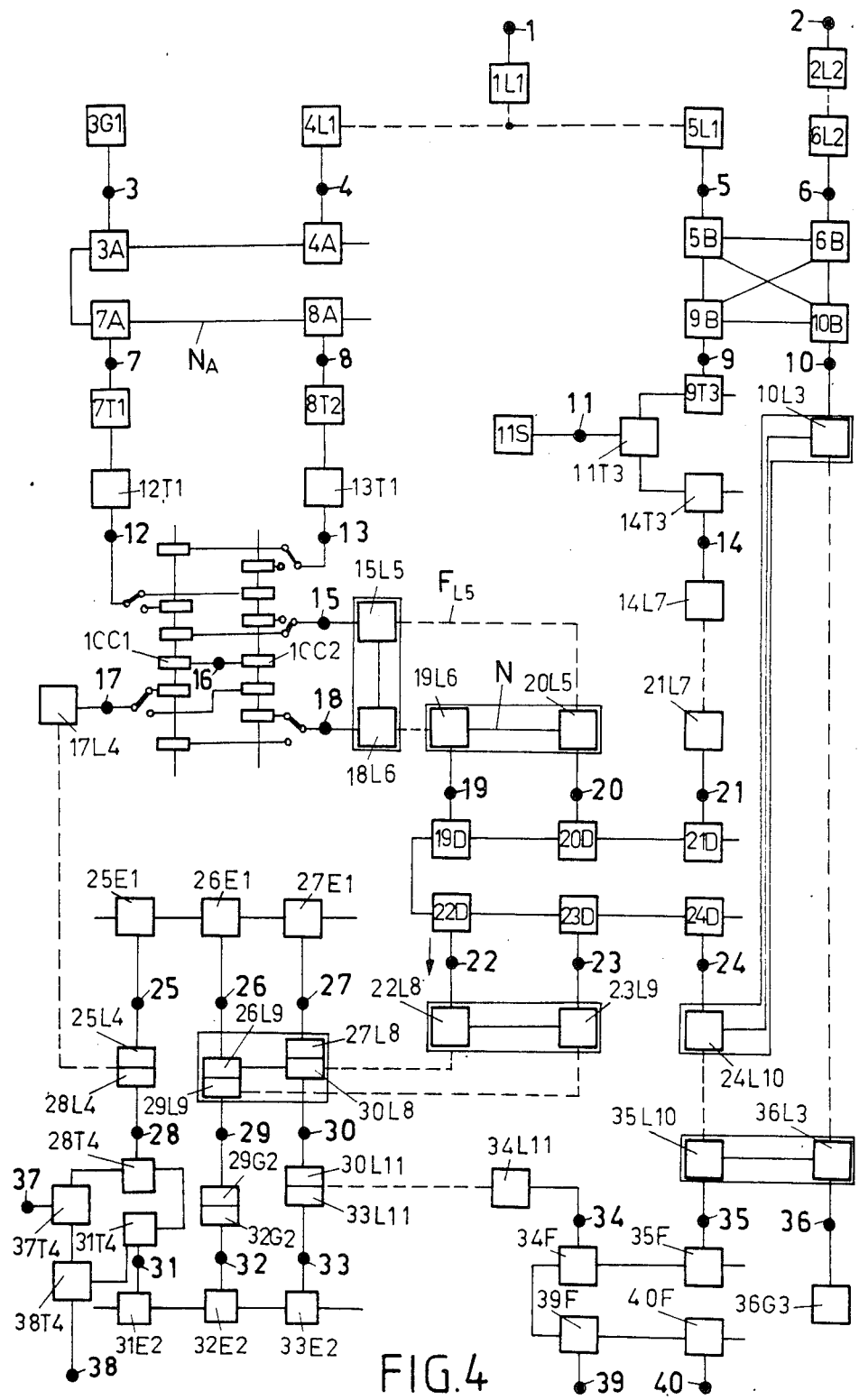
FIG. 4 shows a communication network of a protective device according to the invention which comprises transmitter/actuator units, evaluating units and local and remote data links.

FIG. 4 shows a communications network of a protective device according to the invention. This communications network displays largely the same topological configuration as the energy distribution system to be protected which is shown in FIG. 1. The transmitter/actuator units are designated by reference FIGS. 1, 2 . . . , 39, 40. Each transmitter/actuator unit, for example, 3, are associated with exactly two evaluating units, such as, for example, 3G1, 3A. Allocation is carried out via local data links between all evaluating units of all transmitter actuator units which are arranged at the boundaries of the protection zone of an object to be protected. If the object to be protected is, for example, busbar A, the associated evaluating units 3A, 4A, 7A and 8A are linked with each other by local data links. According to FIG. 2, the relevant local data links are shown as continuous lines also in FIG. 4.

In the case of busbar A, the transmitter/actuator units 3, 4, 7 and 8 are located close together in a substation. However, it is also conceivable that the protection zone is geographically dispersed as in the case of a line, a cable or with extended switching systems (distance between the transmitter/actuator units greater than several hundred meters). At each of the ends of such an object to be protected, which can be an overhead line, a cable or an extended switching system, for example $L_3$, $L_8$, $L_9$ or $L_{10}$, one evaluating unit, for example 10L3 and 36L3; 22L8, 27L8 and 30L8; 23L9, 26L9 and 29L9 or 24L10 and 35L10 are arranged. The evaluating units of each object cooperate via remote data links. According to FIG. 2, the subject remote data links F are shown in dashed lines. See also FIG. 4.

In cases in which faults can occur between two objects to be protected, for example between lines $L_5$ and $L_6$, $L_8$ and $L_9$ or $L_{10}$ and $L_3$, the associated evaluating units must be matched to each other. This is possible by additional data links generally constructed as local links. Such links are provided, for example, between 15L5 and 18L6, 20L5 and 19L6, 22L8 and 23L9, 27L8 and 26L9, 35L10 and 36L3 and 24L10 and 10L3.

The local data links N can be optionally constructed as a bus system or permanently installed conductors (point to point links). In FIG. 4, for example, the evaluating units 4A, 3A, 7A and 8A are linked with each other by means of a bus system but the evaluating units 5B, 6B, 9B and 10B, in contrast, are linked with each other by point to point links. If the requirements on the redundancy of the data links are lower, individual links between 5B, 6B, 9B and 10B can also be omitted, leaving a tree structure, or can be activated only if tree branches fail.

The remote data links F can be, for example, optical waveguides (polytetrafluoroethylene), cable cores, directional radio or carrier-frequency links.

It is sufficient if at least one unsecured (fast) transmission link is available since then a directional criterion determined by the protective device DR can be transmitted in case of a fault. But if back-up functions are also to be provided, a secured (slow) link must also be provided for transmitting a direct or indirect switching-off command.

The local data links N and remote data links F transmit the following signals:

(1) All transmitter/actuator units involved indicate a fault direction to the object to be protected (global message) or at least one transmitter/actuator unit involved indicates fault direction from the object to be protected or is undecided, faulty and so forth and/or a specified group within the transmitter/actuator units involved indicates a fault direction to the object to be protected (group message) or at least one transmitter/actuator unit involved from this specified group indicates fault direction from the object to be protected or is undecided, faulty and so forth. The specified group can be different for each data link within the protection zone. The specified group can also comprise only one transmitter/actuator unit (single message).

(2) The signals described in the preceding paragraph (1) can also be represented in complementary or other forms in accordance with Boolean algebra rules.

(3) Dead-zone detection signals (4) Back-up switch signals (5) All signals transmitted by data links $V_{DR}$ and $V_{CB}$ can also be transmitted by local data links N and remote data links F either individually or in a suitably preprocessed form.

The signals specified in the above list are of a binary character.

The protective device according to the invention operates as follows:

Each evaluating unit has the objective of detecting faults and identifying the location of faults inside or outside the protection zone of one of the objects on the basis of the information of the protective device DR of the associated transmitter/actuator unit and the incoming information from the remaining transmitter/actuator units of a protection zone and, if necessary, tripping its respective switching point.

In this context, means are suitably provided in each evaluating unit for blocking the evaluating unit in the case of switching actions within the protection zone since it must be assumed that the protective device DR may not possibly be able to differentiate between signals caused by faults and signals caused by switching actions.

The evaluating unit, for example 22D, receives the signals arising from the associated protection device DR and the remaining evaluating units, for example 19D, 20D, 21D, 23D, 24D associated with a protection zone. By way of example busbar D combines these signals (normal operation of the transmitter/actuator unit with a data flow marked by directional arrows in FIG. 3). If the fault has been recognized as being located inside the common protection zone after evaluation of all direction signals of the protective devices DR, taking into account the measurement orientation m of the transmitter/actuator units, a signal is locally emitted which opens its own switching point, for example 22'. The same is true for evaluating units 19D, 20D, 21D, 23D and 24D with respect to switching points 19', 20', 21', 23' and 24'. In the tripping case, each current-sensing unit SU monitors whether the currents of current transformers CT of the associated measuring point have become zero after an expected period associated with switching points, for example 22', 24' of the transmitter/actuator units, for example 22, 24, has elapsed. This is reliably the case if the fault is located inside the protection zone concerned, neglecting a "dead zone" between the current transformer of the measuring point and the switching point.

As can be seen from FIG. 3, at each of the transmitter/actuator units, for example, 22, a "dead zone" is located between current transformer CT of the measuring point and the switching point, for example 22'. As a result, in case of a fault, the direction relay DR of the subject transmitter/actuator unit recognizes the fault, shown by a zig-zag arrow, identifying it as for example an earth leak or a short circuit, and as being located opposite to the measurement orientation m. Assume that transmitter/actuator unit 22 is arranged, for example, in such a manner that its associated switching point 22' is connected to busbar D and its associated measuring point is connected to line $L_8$ (direction arrow m of the transmitter/actuator unit 22 in FIG. 3). If a fault occurs in the dead zone located between the switching point and the measuring point of this unit, the evaluating units 19D, 20D, 21D, 22D, 23D, 24D will recognize this fault as being located inside the protection zone delimited by switching points 19', 20', 21', 22', 23' and 24' and evaluating units 22L8, 27L8 and 30L8 will recognize it as being located outside the protection zone delimited by switching points 22', 27', 30'. Evaluation units 19D, 20D, 21D, 22D, 23D and 24D cause the switching points 19' to 24' associated with the transmitter/actuator units 19 to 24 to open and busbar D is isolated even though the remaining system is still faulty in line $L_8$.

The current-sensing unit SU provided in transmitter actuator unit 22, however, detects that the fault current in the transmitter/actuator unit 22 has not disappeared despite the open switching point 22'. It then forms a dead zone detection signal $t_1$ which acts via a data link $V_{R,t1}$, evaluating unit 22D and local data links N to 23D, 19D etc. on the remaining transmitter/actuator units 19, 20, 21, 23 and 24 in which the fault current has disappeared. As a result, the above mentioned transmitter/actuator units reclose their associated switching points 19', 20', 21', 23' and 24'. Thus, the current-sensing unit SU in 22 also detects that the fault is in the "dead zone" of its own transmitter/actuator unit and forms another dead-zone detection signal $t_2$ which, via a data link $V_{R,t2}$, evaluating unit 22L8 and remote data link F and local data link N, causes evaluating units 27L8 and 30L8 to open switching points 27' and 30' associated with transmitter/actuator unit 27 and 30. As a result, line $L_8$ connected to the faulty "dead zone" is isolated.

It is conceivable that a fault occurs in the "dead zone" when the switching point, for example 22' of a transmitter/actuator unit, for example 22, is open (see FIG. 3). The pre-fault condition under which such a fault can occur is characterized by three signals designated "switching point open", "measuring point under voltage" and "current at the measuring point equals zero". These signals are evaluated in two evaluating units, for example 22D and 22L8 of the associated transmitter/actuator unit, for example 22. In the evaluating unit of the protection zone located in the direction of the measurement orientation m of the transmitter/actuator unit, for example 22, for example that of line $L_8$, the direction signal of DR is then evaluated in the opposite sense (reversal of direction) and this direction signal is suppressed (blocked) in the other evaluating unit, for example 22D.

If then, when a fault occurs in the "dead zone" for instance of transmitter/actuator unit 22, the associated switching point 22' is already opened, the fault direction detector DR associated with the transmitter/actuator unit 22 reports that a fault has occurred in the protection zone allocated to busbar D whereas the fault direction detectors contained in the transmitter/actuator units 19, 20, 21, 23 and 24 do not specify any fault direction at all since, of course, the switching point 22' located between the busbar D and, therefore, transmitter/actuator units 19, 20, 21, 23 and 24 and the fault location is open.

If the direction signal from protective device DR in the evaluating unit 22D is blocked, units 19D and 24D are prevented from responding. An inversion of the same direction signal in evaluating unit 22L8 causes the fault to be recognized as being located in the protection zone of line $L_8$ and evaluating units 27L8 and 30L8 provide tripping signals to their switching points 27 and 30 which causes line $L_8$ connected to the faulty "dead zone" to be isolated.

The protective device according to the invention also makes it possible to implement back-up switch protection. If a switching point associated with a transmitter actuator unit fails, the current-sensing unit SU of this transmitter/actuator unit detects, in the case of a fault, that the current does not drop to zero in the transmitter actuator unit although the transmitter/actuator unit has formed a command for opening the switching point.

In relation to switching point 22' if, for example, a fault is present on line $L_8$, the fault is detected by transmitter/actuator units 22, 27 and 30 and evaluated in the associated evaluating units 22L8, 27L8 and 30L8. Evaluating units 27L8 and 30L8 supply the tripping commands for opening switching points 27' and 30' to 27 and 30, respectively. Unit 22L8 provides 22 with the tripping command for opening switching point 22'. However, switching point 22' may not open and the current in current transformer CT of 22 may not drop to zero after the natural period of the switch (independently of the acknowledgement by auxiliary contacts of the switch of the switching point).

This switch failure is detected by SU in 22. SU supplies via the local data links $V_R,t_1$ and $V_R,t_2$ a back-up switch signal R to the evaluating units 22D and 22L8. 22D passes the back-up switch signal R via the local data link N to 19, 20 21, 23, 24, which causes these switches to trip.

If, in the case of a defective switch of the transmitter/actuator unit 22, the fault is located on the busbar D, the evaluating units 19D to 24D supply tripping commands to 19 to 24. As described before, 22 fails and reports its failure to 22D and 22L8. 22L8, corresponding to 22D, emits a back-up switch signal. 22L8 and 30L8 then trip switch positions 27' and 30'.

The protective device according to the invention can be simply constructed in such a manner that even a failure of the protective device DR and of current-sensing unit SU of a transmitter/actuator unit will not impair the protective function. To this end, in each of the transmitter actuator units, for example 22, a self-monitoring unit SU, shown in FIG. 3, is provided which continuously monitors the operational integrity of DR and SU and reports any failures to the two associated evaluating units, for example 22D and 22L8. If DR and/or SU are non-operational, a data link located between the two evaluating units, for example 22D and 22L8 is activated (switch symbol S' in FIG. 3) which connects the two evaluating units together as a result of which the protection zones of the two relevant objects to be protected, for example D and L8, form a common protection zone. As a result of the protection zones being connected together in this manner, the protective devices PU do not need to be duplicated.

The operational integrity of the evaluating units, for example 22D, 22L8 within a transmitter/actuator unit can be ensured through redundancy arrangements (duplication or 2-of-3 arrangement).

To keep the protective device according to the invention fully functional even in the case of a failure of the local data link N and/or remote data link F, these links are suitably arranged in a redundant network. Such a redundant network would then have the characteristic that, if one of the links is interrupted, the signal to be transmitted reaches its destination via a redundant back-up link. If, for example in the communications network according to FIG. 4, the remote data link from 17L4 to 25L4 and 28L4 were interrupted, the information flow could be maintained via a back-up line which leads from 17L4 via the remote links between 15L5 and 20L5 and 23L9 and 29L9 to 25L4 and 28L4.

What is claimed is:

1. A protective system for protecting elements of an electric power system of the type having at least first and second circuit elements which are to be selectively isolated from each other and from a remainder of said power system, said elements being isolatable by at least first, second and third circuit breakers, said protective system comprising:

a first transmitter/actuator unit associated with said first circuit breaker, at least one second transmitter/actuator unit associated with said second circuit breaker, at least one third transmitter/actuator unit associated with said third circuit breaker;

at least one first data link for connecting said first and said second transmitter/actuator units;

at least one second data link for connecting said first and said third transmitter/actuator units;

each one of said transmitter/actuator units including:
means for measuring a fault current flowing through its respective circuit breaker;
fault-direction detecting means for detecting direction of said fault current with respect to a first protection zone which protection zone is defined by selected ones of said circuit breakers of said protection system which are associated with said first element, or with respect to a second protection zone defined by another group of selected ones of said circuit breakers which are associated with said second element;
first and second evaluation units; a first branched data link for transmitting output signals from said fault-direction detecting means to said first and second evaluation units; a second branched data link for transmitting command signals for opening and closing said circuit breakers;
said first evaluation unit of said first and said second transmitter/actuator units being connected to one another by said first data link, said evaluation units including means for logically relating outputs from said fault-direction detecting means and for decoding whether a fault condition is occurring inside or outside said first protection zone; and
said second evaluation unit of said first transmitter/actuator unit being connected to one of said evaluation units of said third transmitter/actuator unit through said second data link;
said evaluation units receiving output signals from said fault-direction means and further including means for logically relating said output signals to determine if a fault has occurred inside or outside said second protection zone and means for generating and transmitting signals for opening said circuit breakers associated with said second protection zone when said fault is determined to occur inside said second protection zone.

2. The protective system of claim 1 in which said first data link comprises a local data link.

3. The protective system of claim 1 in which said first data link comprises a remote data link.

4. The protective system of claim 1 in which said second data link comprises a local data link.

5. A system as in claim 1 wherein each one of said transmitter/actuator units includes a current sensing unit having means for detecting the current in its respective one of said elements and for comparing said current to zero and means for forming a dead-zone detection signal to cause a respective element to be connected and another element to be isolated.

6. The system of claim 5 further comprising a respective self-monitoring device in each one of said transmitter/actuator units, said self-monitoring device being effective for reporting a failure of a component of its respective transmitter/actuator unit.

7. The system as in claim 6 wherein said self-monitoring device is effective for reporting a failure in any one of said fault-direction detecting means, said current sensing unit, a switching point associated with said respective transmitter/actuator units, and in said evaluating units of said transmitter/actuator unit.

8. The system as in claim 6 further comprising a further data link (S') arranged between the two respective evaluating units of said respective transmitter/actuator unit, said further data link (S') being effective for receiving said failure report and for thereafter coupling the two evaluating units together to form a single evaluating unit which is effective for operating and communicating with others of said transmitter/actuator units associated with other protection zones.

* * * * *